Patented Oct. 26, 1954

2,692,870

UNITED STATES PATENT OFFICE 2,692,870

COMPOUNDED RUBBER STOCK

Alphonse Pechukas, Akron, Ohio, assignor, by mesne assignments, to Columbia-Southern Chemical Corporation, Pittsburgh, Pa., a corporation of Delaware No Drawing. Application June 29, 1950,
Serial No. 171,237

5 Claims. (Cl. 260—41.5)

The present invention relates to a novel composition of matter suitable for use as an improved rubber reinforcing pigment and also to rubber compositions containing such pigment and to the methods of producing these materials.

It is known that silica in finely divided state having a particle size below 0.1 micron is an effective rubber reinforcing pigment. However, one of the objections to finely divided silica when incorporated in rubber compositions resides in the fact that the compositions containing such silica cure at a very slow rate. Furthermore, the finally cured compositions often exhibit unduly low strength characteristics. In addition, rubber compositions containing finely divided silica tend to exhibit substantial heat build-up when the cured rubber composition is subjected to dynamic tension.

To a substantial degree, these objectionable characteristics of finely divided silica are avoided when the silica contains a substantial quantity (2 to 10 percent by weight) of free water, that is water which is capable of being vaporized or driven off from the pigment by heating at a temperature of 105° C. for a period of 24 hours. However, the required concentration of free water is not present in most silica pigments and in any event may be driven off during milling thus making control difficult.

According to the present invention, I have been able to eliminate or substantially minimize these undesirable characteristics of silica and to provide a novel silica rubber pigment composition and novel rubber compositions containing such silica pigment which cure rapidly and which have optimum tensile strength and which do not exhibit the undesirable heat build-up commonly observed in prior silica pigments. I have found that these undesirable strength properties and heat build-up characteristics of silica may be avoided by coating the finely divided silica with a water miscible alkylol amine or by incorporating silica and the alkylol amine in a rubber composition. Thus, the silica may be precoated with the amine or uncoated silica together with triethanol amine or other alkylol amine may be compounded with rubber and the various other agents compounded with rubber.

Various alkylol amines are suitable for the purpose. These alkylol amines should be water miscible and the alkyl radical usually contains up to 5 carbon atoms. Typical alkylol amines which have been found to be suitable are mono-, di- and tri-methanol amines, mono-, di- and tri-ethanol amines, mono-, di- and tri-propanol amines, mono-, di- and tri-isopropanol amines and mono-, di- and tri-butanol amine. Other alkylol amines which may be used are 2-ethyl-aminoethanol, 2,2 - ethyliminodiethanol, 2 - dimethylaminoethanol, 2-diethylaminoethanol, 2-butylaminoethanol, 2-isobutylaminoethanol, 2-methylaminoethanol, 2,2-methyliminodiethanol, 2 - amino-2-1-propanol, 2 - amino-1-butanol, 2-amino - 2 - ethyl - 1,3 - propanediol, 2-amino-2-methyl-1,3-propanediol and 2-amino-2-hydroxymethyl-1,3-propanediol. Higher alkylol amines may be used provided such amines are water miscible.

The amount of triethanol amine or other alkylol amine which is used is capable of some variation. Normally, about 2 to 15 percent of the amine based upon the weight of the silica, is found to be suitable. While some departure from this range is possible, it is normally found that excessive amounts of amine have an adverse effect upon the properties of the ultimate rubber composition whereas lower concentrations of amine are insufficiently effective.

The use of an alkylol amine as herein contemplated has been found to be advantageous in connection with the calcium oxide silica pigment which has been described and claimed in a copending application of Edward M. Allen, Serial No. 63,205, filed December 2, 1948. Such application describes a method of preparing a silica pigment by reacting finely divided precipitated calcium silicate having an average ultimate particle size as determined by the electron microscope below about 0.1 micron (normally about 0.025 micron as measured by the electron microscope) with an acid having an anion which forms a water soluble calcium salt. Typical acids which may be used for this purpose include hydrochloric acid, nitric acid, hypochlorous acid, hydrobromic acid, and acetic acid.

Sufficient acid is added to produce a slurry having a pH on the acid side, usually below about 4. Thereafter, the pH of the slurry is normally adjusted above 7, normally to about 7 to 8, and the precipitated silica is recovered by decantation and filtration and is dried in an oven at temperatures of 100 to 140° C.

The water content of this product normally is above 4 percent by weight, frequently being as much as 15 to 20 percent of the total weight of the product. Such a pigment contains a substantial quantity, usually within the range of 2 to 10 percent by weight of the pigment of "free water" as previously defined. The balance of the water present is in the form of "bound water" which is the amount of water driven off from a silica pigment of the type herein described by heating the pigment at ignition temperature, for example, 1000 to 1200° C. until no further water can be removed, minus the amount of free water in the pigment. Bound water which is present in concentrations of about 2 to 10 percent by weight of the pigment, appears to be in chemical combination with the silica.

The resultant silica also contains small amounts of calcium or like alkaline earth metal, depending upon the nature of the silicate used in its production and in general, the alkaline earth metal content, computed as alkaline earth metal oxide normally is present in a range of about ½ to 3 percent by weight of the total pigment. On the anhydrous basis, it will be understood that this range is somewhat higher. Thus the alkaline earth metal oxide content of the silica, computed on the anhydrous pigment ranges from about ½ to 5 percent by weight. The following are typical analyses of silica pigments which may be prepared according to the above mentioned application:

| Sample No. | $SiO_2$, Percent | $R_2O_3$ (Aluminum and iron oxide) | CaO | Cl | Loss on Ignition ($H_2O$ and $CO_2$), Percent |
|---|---|---|---|---|---|
| 1 | 82.3 | 1.30 | 1.40 | 0.21 | 15 |
| 2 | 86.5 | 0.73 | 1.18 | ----- | 11.6 |
| 3 | 79.77 | 1.16 | 2.54 | 0.89 | 15.6 |
| 4 | 79.9 | 2.2 | 3.0 | 0.37 | 14.5 |
| 5 | 83.99 | 0.80 | 1.31 | 0.47 | 14.4 |

The following is a complete analysis of a silica pigment of the type contemplated which is supplied to the trade on a commercial scale:

|  | Per cent |
|---|---|
| $SiO_2$ | 85.31 |
| CaO | 2.30 |
| MgO | 0.12 |
| Na | 0.28 |
| $R_2O_3$ | 0.31 |
|    $Fe_2O_3$ | 0.166 |
|    $Al_2O_3$ | 0.083 |
|    $TiO_2$ | 0.047 |
|    $ZrO_2$ | 0.014 |
|    $Cr_2O_3$ | 0.001 |
| Ni | 0.001 |
| Cu | 0.001 |
| Mn | 0.0028 |
| Cl | 0.61 |
| $P_2O_5$ | 0.015 |
| $CO_2$ | 0.58 |
| $SO_4$ | 0.01 |
| Loss at 105° C | per cent 6.62 |
| Loss on ignition | do 11.62 |
| pH | [1] 8.5 |

[1] 5.0 grams sample + 95 ml. $H_2O$ + 2 drops saturated KCl solution
Percentages in the above tables are by weight.

As pointed out in the above mentioned application, the presence of the free water in the silica materially increases the rate of cure of rubber compositions in which the silica is incorporated and also increases the tensile and other strengths of the rubber composition. Hence, where the free water content is high, the use of an alkylol amine in conjunction with the silica in a rubber composition is not as necessary although improved results are obtained when the alkylol amine is used in such cases. Where the free water content is low or substantially absent, very poor results are obtained unless the alkylol amine is used.

The rubber compositions herein contemplated may be prepared simply by milling silica, alkylol amine, rubber and rubber vulcanization agents and other conventional compounding agents together in a conventional manner and vulcanizing the resulting product. Concentrations ranging from 5 to 100 volumes of silica per hundred volumes of rubber are found to be suitable. The term rubber as herein contemplated, is intended to include natural rubber and the conventional synthetic rubbers such as butadiene-styrene copolymers known as "GR–S" rubber which are copolymers of 10 to 60 percent by weight of styrene and 90 to 40 percent by weight of butadiene, butadiene-acrylonitrile copolymers derived by copolymerization of 40 to 90 percent by weight of butadiene, 60 to 10 percent of acrylonitrile, neoprene rubber, isobutylene polymers and copolymers of isobutylene with 0.01 to 4.0 percent by weight of isoprene (based upon the weight of isobutylene) or other elastomers prepared by polymerization of butadiene-1,3,isoprene, piperylene, 2,3-dimethyl butadiene, 2-chlorobutadiene-1,3 or other comparable polymerizable compound alone or in admixture with one or more organic, monomeric or ethylenic compounds including acrylonitrile, isobutylene, vinyl chloride, vinyl acetate, styrene, methyl methacrylate, methyl alphachloroacrylate, methyl acrylate and the like.

According to a further embodiment of this invention, the silica may be precoated with the alklyol amine prior to its incorporation in a rubber composition. This may be effected, for example, by spraying the dry pulverulent silica with an alkylol amine while tumbling the silica or otherwise agitating it to an extent necessary in order to insure thorough mixing of the alkylol amine with the silica. Such precoating offers certain definite advantages. In the first place, it permits preparation of a standardized product which may be added to conventional rubber compounds without the necessity for adjustment of the rubber recipe by a rubber compounder during the rubber compounding. Furthermore the alkylol amine becomes more thoroughly associated with the silica and thus is more effective in combating the disadvantageous properties of the silica than would be the case where the amine simply is added to the rubber compound.

The invention will be more fully understood by reference to the following illustrative examples:

EXAMPLE I

Streams of aqueous sodium silicate solution containing 100 grams per liter of $SiO_2$ as $Na_2O$ $(SiO_2)_{3.36}$ and calcium chloride solution containing 100 grams per liter of $CaCl_2$ and 30 to 40 grams per liter of sodium chloride were fed directly into the central area of a centrifugal pump at 150° F. The rates of flow were adjusted so that calcium chloride was approximately 10 percent in excess over the stoichiometric quantity required for reaction and that the amount of liquid supplied to the pump was about 25 percent below the output capacity of the pump. In consequence, the solutions were subjected to turbulent intermixing in the pump.

The slurry of calcium silicate thus produced was introduced into a tank and sufficient hydrochloric acid solution containing 28% by weight of HCl was added, with stirring, to reduce the pH of the slurry to 2. Thereupon, sufficient sodium hydroxide solution containing 40% by weight of NaOH was added to raise the pH of the slurry to 7.5. The precipitated silica was recovered by decantation and filtration and dried in a oven at an oven temperature of 120 to 140° C. for 12 hours. The free water content of the product was within the range of 3 to 8 percent by weight of the pigment.

Finely divided silica thus prepared, was dried at 105° C. for 24 hours in order to remove all of the free water. This material was ground in a micropulverizer and was placed in an oven at 105° C. for 48 hours. The finely divided silica thus obtained was placed in a conditioning room at a temperature of 25° C. and a relative humidity of 50%. Samples were removed from the conditioning room, the moisture content of each sample measured by drying a portion of the sample at 105° C. for 24 hours and measuring the loss of free water as defined and each sample was compounded in a rubber composition according to the following formula:

| | Parts by weight |
|---|---|
| GR–S | 100 |
| Zinc oxide | 5 |
| Sulfur | 3 |
| Phenyl-beta-naphthylamine | 1 |
| Benzothiazyl disulfide | 1.20 |
| Tetramethyl thiuram disulfide | 0.15 |
| Paracoumarone-indene resin | 15.00 |
| Triethanol amine | 4.9 |
| Silica pigment | 58.5 |

The rubber compounds so prepared were vulcanized according to standard accepted procedure and the vulcanized rubber products thus obtained were subjected to tests according to standard accepted methods of testing well established in the rubber art in order to determine the tensile strength, the tear strength and the optimum rate of cure of the rubber compounds obtained from each of the samples produced.

The results of the tests are set forth in the following table:

*Table I*

| Free Moisture Content Percent by weight (based on initial pigment) | Cure at 280° F., Minutes | Tensile, Pounds per Square inch | Tear, Pounds per Inch thickness |
|---|---|---|---|
| 0.5 | 15 | 2,670 | 250 |
|  | 20 | 2,780 | 200 |
|  | 30 | 2,670 | 200 |
|  | 45 | 2,600 | 210 |
|  | 60 | 2,450 | 190 |
|  | 90 | 2,450 | 200 |
| 5.5 | 15 | 2,600 | 210 |
|  | 20 | 2,610 | 220 |
|  | 30 | 2,600 | 180 |
|  | 45 | 2,600 | 150 |
|  | 60 | 2,440 | 150 |
|  | 90 | 2,330 | 160 |

This data illustrates the combined effect of an alkylol amine and free water to increase the rate of cure of the rubber composition and further to materially increase the tensile strength of the composition at optimum curing time.

The following tests were performed and demonstrate the results obtained when no alkylol amine was present:

Finely divided silica prepared according to the disclosure of the above identified application was dried in an oven at 105° C. overnight. The dried pigment contained 0.5 percent free water. A 500 gram portion of this pigment was placed in a pan and conditioned at 77° F. and 50 percent relative humidity for various periods of time. The free water content of the conditioned sample was determined by drying at 105° C. for 24 hours and the dried pigment and the conditioned sample were compounded in rubber compositions according to the following formula:

| | Parts by weight |
|---|---|
| GR–S | 100.0 |
| Zinc oxide | 5.0 |
| Sulfur | 3.0 |
| Phenyl-beta-naphthylamine | 1.0 |
| Benzothiazyl disulfide | 1.2 |
| Tetramethyl thiuram disulfide | 0.15 |
| Paracoumarone-indene resin | 15.0 |
| Silica pigment | 58.5 |

These rubber compounds were tested for tensile and tear strength according to standard accepted methods normally used in testing such compositions and the following results were obtained:

*Table II*

| Free Moisture Content Percent by weight (based on initial pigment) | Cure at 280° F., Minutes | Tensile, Pounds per Square Inch | Tear, Pounds per Inch thickness |
|---|---|---|---|
| 0.5 | 180 | Undercured. | Undercured. Do. |
| 5.5 | 120 | do | |
|  | 150 | 450 | 100. |
|  | 180 | 680 | 140. |

It will be noted that the above tests clearly illustrate the advantageous effect of the addition of the triethanolamine. Thus in Table I, it is shown that using 4.9 parts by weight of triethanol amine a satisfactorily cured product was obtained within 20 to 30 minutes even when the free water content of the product was as low as 0.5 percent. In contrast, when no triethanol amine was used, as shown in Table II, samples containing as much as 5.5 percent by weight of free water produced uncured rubber compositions even after 120 minutes. Thus it will be seen that the presence of the triethanol amine greatly increased the rate of cure in this case. Similar results are obtained when monoethanolamine and the other amines set forth in columns 1 and 2 are used in lieu of the triethanol amine.

EXAMPLE II

To further demonstrate the effect of triethanol amine, silica prepared as in Example I and containing 5.5 percent by weight of free water and 4.2 percent by weight of bound water was compounded with GR–S rubber according to the following recipe, test specimens were prepared and cured and the vulcanized rubber was tested to determine its physical properties according to standard methods. The results obtained were as follows:

| | Parts by weight |
|---|---|
| GR–S | 100.0 |
| Zinc oxide | 5.0 |
| Sulphur | 3.0 |
| Phenyl-beta-naphthylamine | 1.0 |
| Benzothiazyl disulfide | 1.2 |
| Tetramethyl thiuram disulfide | 0.15 |
| Paracoumarone-indene resin | 15.0 |
| Triethanolamine | As shown |

| Triethanolamine | Optimum Cure at 280° F., Min. | Modulus 300% | Tensile, p. s. i. | Percent Elongation | Durometer Hardness (30″) | Tear, Lbs./In. |
|---|---|---|---|---|---|---|
| None | 180 | 240 | 680 | 780 | 42 | 14 |
| 4.9 | 20 | 1,310 | 2,610 | 460 | 67 | 22 |

EXAMPLE III

Finely divided silica prepared as in Example I is mixed with 3.5 parts by weight (based upon the weight of the pigment) of triethanol amine. This coated product is milled with the rubber composition set forth in Example I, omitting the triethanolamine from the recipe. Results comparable to those set forth in Example I are obtained.

It will be understood that the rubber compositions herein contemplated may contain numerous components in addition to silica and rubber. Thus, as shown in the examples, the composition will contain the usual vulcanizing compositions including accelerators, plasticizers, carbon black and other pigments, etc. In dealing with GR-S rubber, it has been found advantageous to incorporate 5 to 20 parts by weight of a coumarone indene resin, preferably a coumarone resin having a melting point of about 100° C.

Although the present invention has been described with reference to specific details of certain embodiments thereof, it is not intended that such details shall be regarded as limitations upon the scope of the invention except insofar as such limitations are included in the accompanying claims.

I claim:

1. A method of preparing a rubber composition which comprises mixing rubber, a precipitated silica prepared by reaction of finely divided alkaline earth metal silicate with an acid which forms a water soluble alkaline earth metal salt, and adjusting the pH of the medium to 7 to 8, and 2 to 15 per cent by weight of a water miscible alkylol amine, based upon the weight of the silica, and vulcanizing the mixture.

2. The process of claim 1 wherein the alkylol amine is triethanol amine.

3. The process of claim 1 wherein the alkylol amine is monoethanol amine.

4. The process of claim 1 wherein the alkylol amine is monopropanol amine.

5. The process of claim 1 wherein the alkylol amine is dipropanol amine.

References Cited in the file of this patent

UNITED STATES PATENTS

| Number | Name | Date |
|---|---|---|
| 2,047,128 | Park | July 7, 1936 |
| 2,114,123 | Heuser | Apr. 12, 1938 |
| 2,250,192 | Cuthbertson | July 22, 1941 |
| 2,329,322 | Baty et al. | Sept. 14, 1943 |
| 2,457,970 | Baillie | Jan. 14, 1949 |
| 2,531,396 | Carter et al. | Nov. 28, 1950 |
| 2,578,605 | Sears et al. | Dec. 11, 1951 |

FOREIGN PATENTS

| Number | Country | Date |
|---|---|---|
| 368,867 | Great Britain | Mar. 17, 1932 |

OTHER REFERENCES

Synthetic Organic Chemicals by Carbide & Carbon Chemicals Corp. Twelfth ed. of 1945, page 78.